United States Patent [19]

Voce

[11] Patent Number: 5,797,003
[45] Date of Patent: Aug. 18, 1998

[54] QUICK ACCESS TO COMPUTER APPLICATIONS

[75] Inventor: Maurice F. Voce, San Carlos, Calif.

[73] Assignee: Compaq Computer Corporation, Houston, Tex.

[21] Appl. No.: 911,346

[22] Filed: Aug. 14, 1997

Related U.S. Application Data

[63] Continuation of Ser. No. 342,117, Nov. 18, 1994, abandoned.

[51] Int. Cl.⁶ ............................................. G06F 9/00
[52] U.S. Cl. ............................................. 395/652
[58] Field of Search .......................... 395/680, 681, 395/651, 652, 653

[56] References Cited

U.S. PATENT DOCUMENTS

| | | | |
|---|---|---|---|
| 4,823,108 | 4/1989 | Pope | 340/721 |
| 5,153,826 | 10/1992 | Johnson | 364/410 |
| 5,167,024 | 11/1992 | Smith | 395/750.04 |
| 5,241,655 | 8/1993 | Mineki et al. | 345/354 |
| 5,257,176 | 10/1993 | Uetani | 364/148 |
| 5,269,022 | 12/1993 | Shinjo et al. | 395/652 |
| 5,386,552 | 1/1995 | Garney | 395/182.08 |
| 5,394,527 | 2/1995 | Fakhruddin et al. | 395/879 |
| 5,423,043 | 6/1995 | Fitzpatrick et al. | 395/683 |
| 5,423,045 | 6/1995 | Kannan et al. | 395/750 |
| 5,471,207 | 11/1995 | Zandi | 341/107 |

OTHER PUBLICATIONS

Cowart, Robert, Mastering Windows™ 3.1, special edition, SYBEX, pp. 64–68, 662, 1993.

Schulman, Andrew, "Unauthorized Windows 95" IDG Books Worldwide, pp. 6, 90, 91, 1994.

Petzold, Charles, "Windows™ 3.1 –Hello to TrueType™, OLE, and Easier DDE; Farewell to Real Mode", Microsoft Systems Journal, pp. 24, Sep. 1991.

Applicant is aware that Hewlett–Packard sells personal digital assistants (model number 100–LX) and sub–notebook computers (OmniBook) which provide for certain applications to be available to the user by pressing dedicated keys or buttons.

Applicant is aware that Rolodex sells pocket personal planners that have dedicated buttons for quickly accessing specific planner applications.

Scheifler, et al., "The X Window System", *ACM Transactions on Graphics*, Apr. 1986, New York, vol. 5, No. 2, pp. 79–109.

*Inside Macintosh, Volumes I and VI*, Oct. 1991, Addison–Wesley, Reading, MA.

*Primary Examiner*—Alvin E. Oberley
*Assistant Examiner*—St. John Courtenay III
*Attorney, Agent, or Firm*—Fish & Richardson P.C.

[57] ABSTRACT

In general, in one aspect, the invention features a method for enabling a user of a computer to rapidly begin using an application which had been previously placed in a non-running state. Prior to the time when the application was placed in the non-running state, information defining an image of an interactive screen associated with the application is stored in the memory of the computer and locked to prevent corruption by other running applications. Then, in response to a request from the user to begin using the application, and before the application has been fully loaded into memory and is again running, the image defined by the stored information is displayed to the user. In this way the user is given the impression that the application has become immediately available.

25 Claims, 4 Drawing Sheets

QUICK ACCESS TO COMPUTER APPLICATIONS

This is a continuation of application Ser. No. 08/342,117, filed Nov. 18, 1994, now abandoned.

Background

This invention relates to accessing computer applications.

If a user wants access to a computer application on a general purpose computer that is turned off, he must wait while a relatively long boot-up process is completed and the application is loaded and started. A delay also happens if a user working on one application wants to use another application that is not then available in memory. Some special purpose pocket-sized personal digital assistants (PDAS) are designed so that a user can have immediate access to any one of several simple applications because they are always immediately available in ROM or RAM. Some portable personal computers provide a "standby" mode which draws reduced power while maintaining an application in memory and keeping the processor "alive". When the user presses a resume button, the application becomes available after a short delay without the need to re-boot the computer or reload the application.

SUMMARY

In general, in one aspect, the invention features a method for enabling a user of a computer to rapidly begin using an application which had been previously placed in a non-running state. Prior to the time when the application was placed in the non-running state, information defining an image of an interactive screen associated with the application is stored in the memory of the computer and locked to prevent corruption by other running applications. Then, in response to a request from the user to begin using the application, and before the application has been fully loaded into memory and is again running, the image defined by the stored information is displayed to the user. In this way the user is given the impression that the application has become immediately available.

Implementations of the invention may include the following features. Keyboard input may be accepted from the user before the application has been fully loaded into memory and is again running. The image may be compressed as it is stored in memory and decompressed for display. Information defining images of interactive screens associated with additional applications may also be stored so that, in response to a request from the user to return any of the applications to a running state, and before the application has been fully loaded into memory and is again running, the video memory may be filled with the image associated with the application. The application may be in a non-running state because a processor in the computer may be in a standby mode. The image for which information is stored may be the image that was being displayed when the application was previously placed in a non-running state.

In general, in another aspect, the invention features a method for causing a portable computer to exhibit the character of both a general purpose computer and a personal digital assistant having dedicated applications. Selected interactive screens associated with the applications available on the portable computer are stored in the computer's memory, even at times when the applications are not running. When a user requests to use the application, and before the application is fully running, the selected interactive screen is displayed while the computer accepts user input for the application in a way that gives the user the impression that the application is fully running.

Implementations of the invention may include the following features. The selected interactive screen can be either the screen which was displayed when the given application was most recently running, or the same one regardless of what interactive screen was last displayed. The user can request to use an application via a dedicated switch. The user may also alter which application is activated by the dedicated switch. There can also be different dedicated switches assigned to a single application, where the switches activate different interactive screens of the application.

In general, in another aspect, the invention features apparatus for causing a portable computer to exhibit the character of both a general purpose computer and a personal digital assistant having dedicated applications. Depressing one of a set of dedicated switches associated with different application programs cause the essentially immediate display of an interactive screen of the associated application, while the computer accepts user input associated with the screen, even when the application is not running.

Implementations of the invention may include the following features. The computer can be configured to provide a multitasking windowed graphical interface in which a user may interact with application programs by observing interactive screens and providing input related to the displays. The non-running state can occur because the processor of the computer enters a standby mode, and the computer can then awaken in connection with responding to the dedicated switch. The interactive screen which is provided essentially instantaneously can be a screen that had been displayed at the time the application entered a non-running state. The interactive screen can also be one preselected from a set of screens available for the associated application. The computer can also store screen information with respect to the associated application in preparation for responding to the dedicated switch. Additional dedicated switches associated with other application programs can be provided, where the computer responds to each of the dedicated switches by essentially instantaneously causing each of those applications to seem active to the user. The associated applications can comprise a number of different software programs, including a calendar, an address book, or a list maker.

Among the advantages of the invention are the following. A general purpose computer can provide one or more applications that seem to instantaneously become available to a user, upon pressing a button. The button or switch can be specially dedicated to this purpose, or be one of the keys found on a conventional keyboard. Any number of applications can be made to seem nearly instantaneously available. The applications can be any sort of software program, including rich graphical applications. The computer can both display a visual interface for the selected program and begin accepting input data from the user, before the program has been fully loaded into memory.

Other advantages and features of the invention will become apparent from the following description and from the claims.

DESCRIPTION

Figure 1:
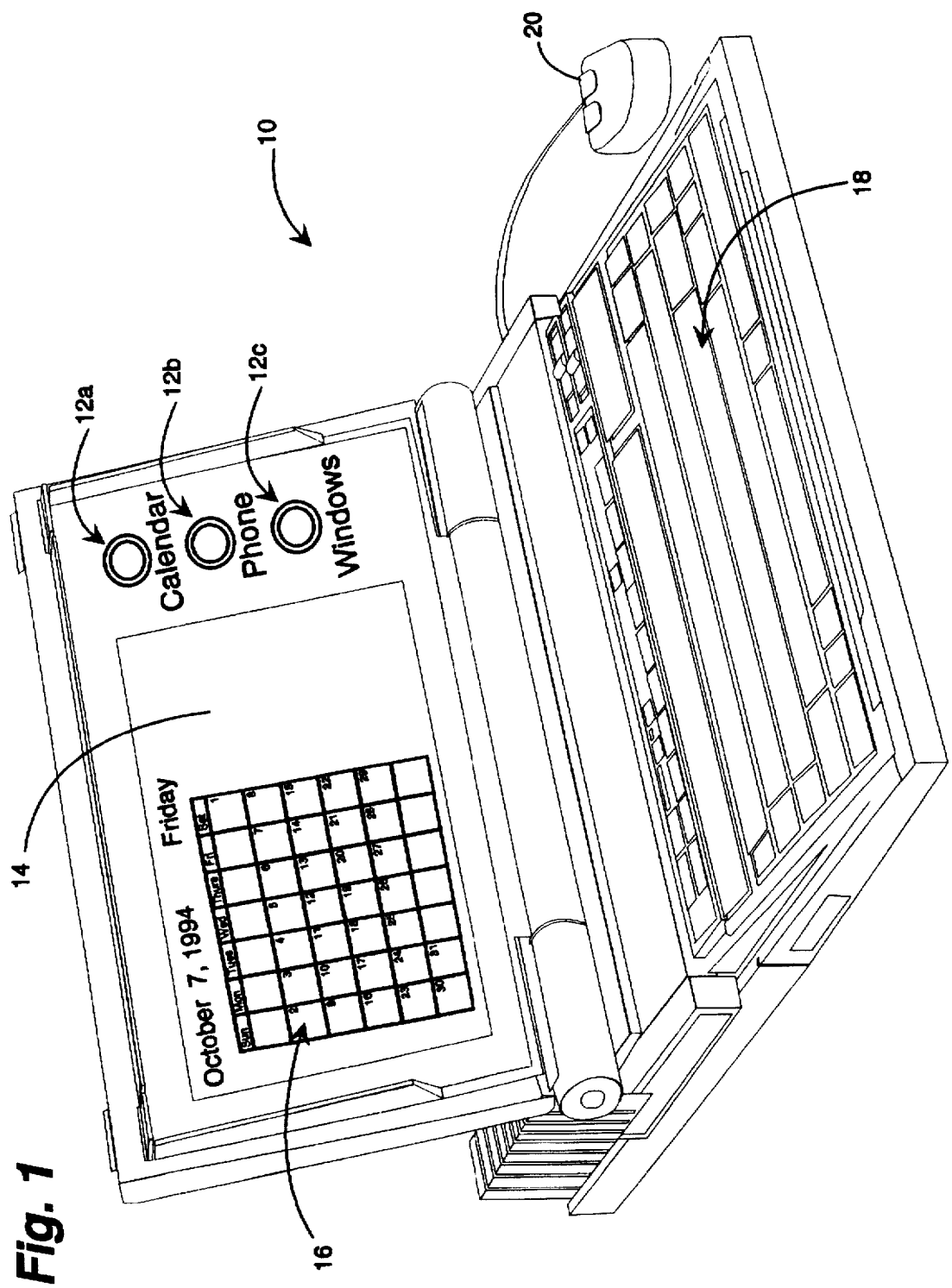
FIG. 1 is a representation of a portable computer providing for quick access to computer applications.

Referring to FIG. 1, a portable computer 10 is configured to provide both the capability and richness of a typical general purpose computer and the feel and convenience of a personal digital assistant (PDA). This is achieved by providing a dedicated set of application keys 12a, 12b, and 12c, associated with respective specific applications (calendar, planner, . . .). The computer is arranged so that when one of the application buttons is pressed at a time when that application is not fully loaded in the memory of the computer and "running", the screen display nevertheless essentially immediately begins to display a screen of the selected application and the computer accepts input from the pointing device and the keyboard all in a way that gives the user the impression that the application was all along present in memory and running. The application also immediately begins to fully load the application and bring it to a fully operational state so that the user is able to make full use of all features of the application within a very short time. In this way, when the user is working, say, in a spreadsheet program running under Windows and wishes to reset an appointment, he can do that essentially with the same convenience of a PDA, simply by pressing the calendar button. He could then return to the spreadsheet program by pressing the Windows button.

Figure 2:
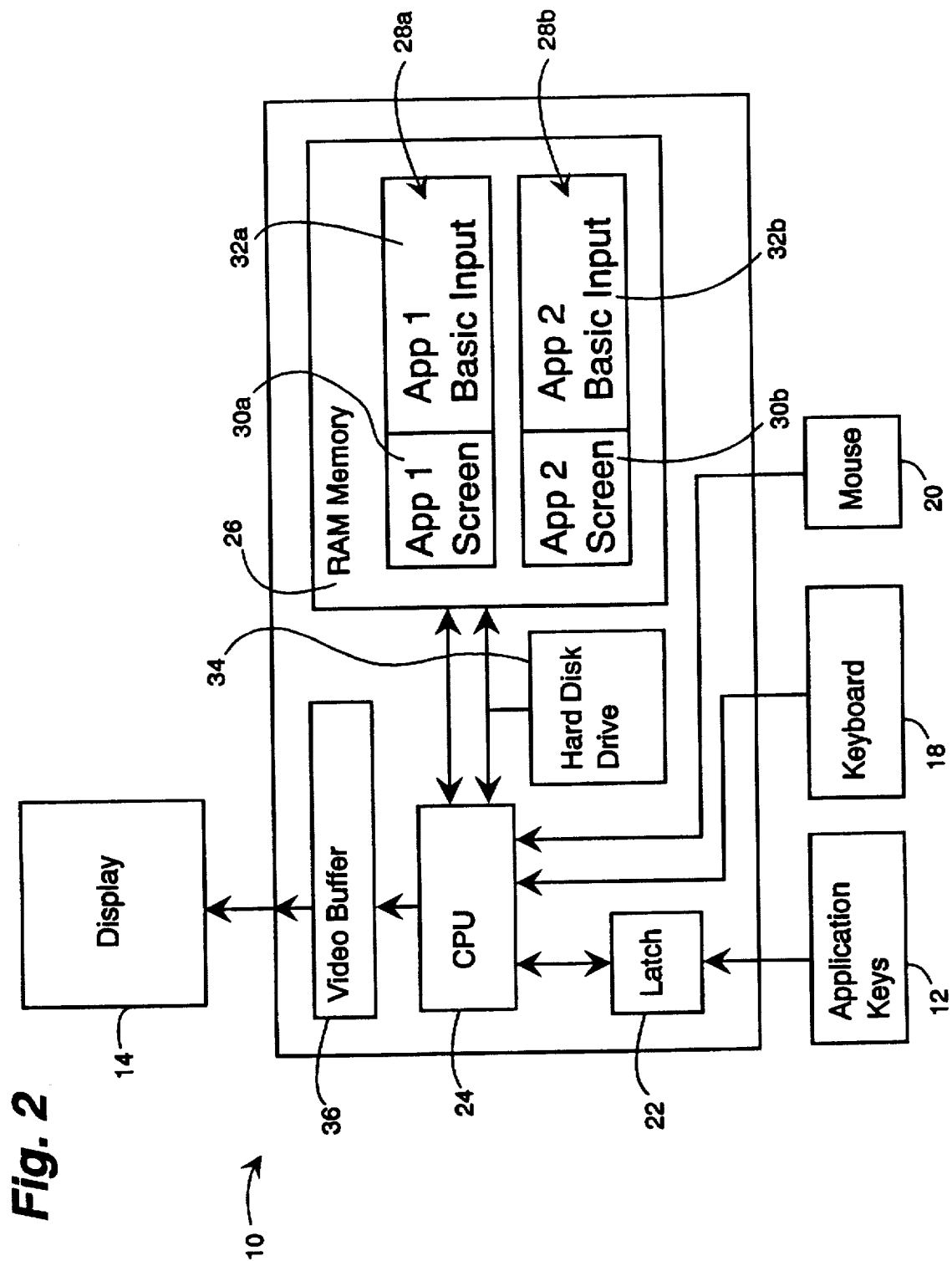
FIG. 2 is a schematic diagram of a computer providing for quick access to computer applications.

Referring to FIG. 2, the application keys 12 connect to a latch 22 that captures the identity of the latest button press. When a button is pressed, latch 22 sends an interrupt signal to central processing unit (CPU) 24, informing the CPU 24 that the user wants to use the selected application. CPU 24 then immediately retrieves from a protected area 28 of random-access memory (RAM) 26, the data and instructions which enable the user to begin to use the application. The application keys 12 can be either specialized switches added to the computer, or merely already existing keyboard switches.

Each application associated with one of the keys 12 reserves space 30 in protected RAM area 28 for recording that application's screen display as it was the last time the application was exited. A compression technique is used to reduce the amount of memory these recorded screen displays 30 require. Each application also reserves a memory area 32 for storing a portion of the application's code which includes the basic input code required for handling keyboard presses, mouse movements and clicks, and other input of the user.

In addition to retrieving the data and instructions stored in protected area 28, the CPU initiates the loading of the full application from hard disk drive 34. Before the full application is loaded into memory from hard disk drive 34 and is running, CPU 24 takes the stored screen display for the chosen application from memory area 30, decompresses it if necessary, and places it in video buffer 36 for transfer to display 14. This gives the user an immediate sense that the chosen application is now available, even as CPU 24 transfers the full code for the program out of the hard disk drive 34 into RAM 26 (that is, if the application is not already there). If the application is already present in memory, it can be loaded by the operating system at once.

If the user starts entering data through keyboard 18 or mouse 20 before the application is fully loaded, CPU 24 uses the basic input software for the application stored in memory area 32 to accept and possibly respond to the input. Since the computer 10 immediately displays the screen for the chosen program and then allows the user to enter a certain amount of data immediately, the user remains unaware that the application is still being transferred into RAM and is not yet fully running. But for many applications, by the time the user has begun entering data, the application will be loaded and operational.

Figure 3:
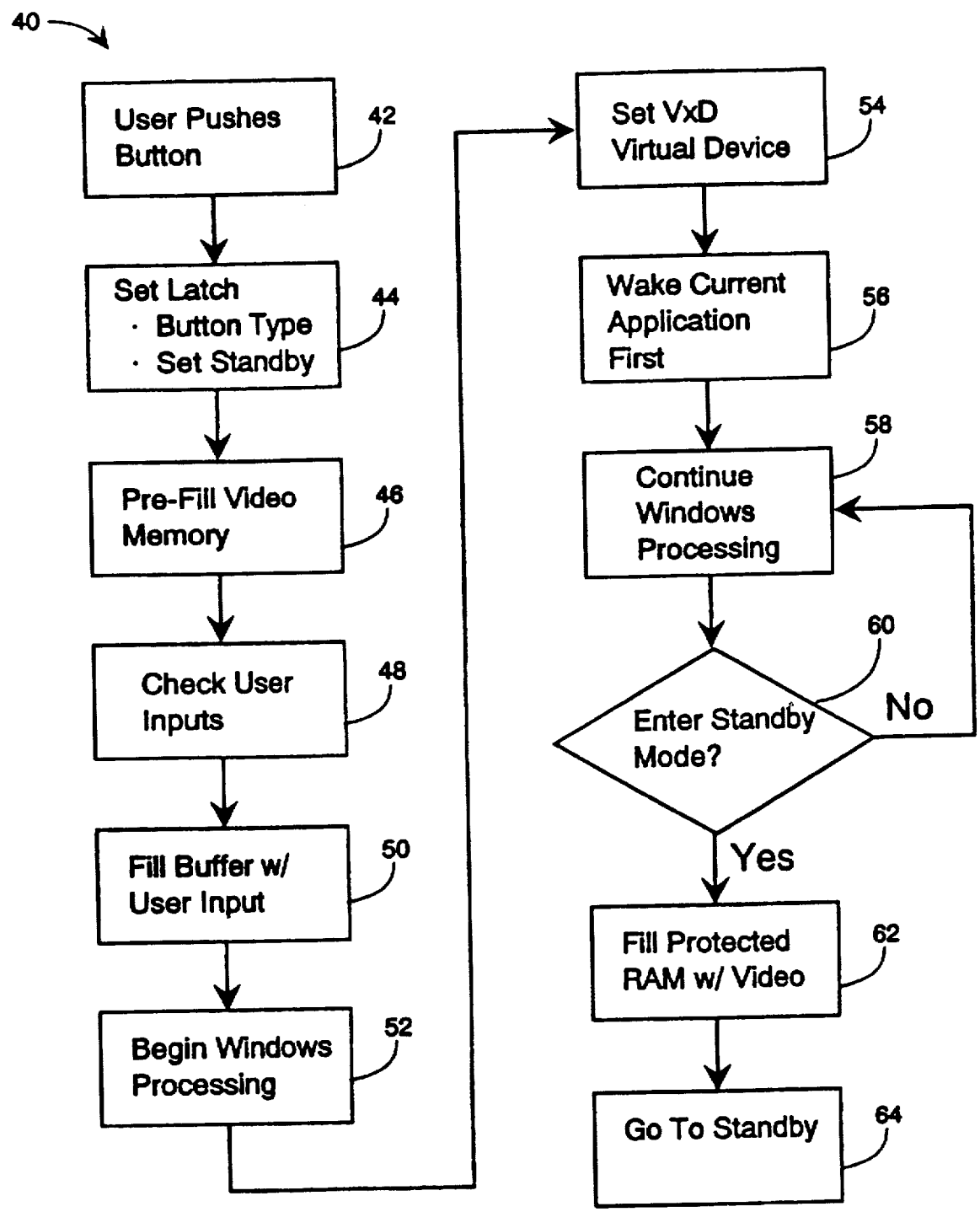
FIG. 3 is a flow chart of a standby sequence for quick access to a computer application.

Referring to the flow chart 40 of FIG. 3, the portable computer can come out of standby mode when a user presses 42 one of the application keys 12. The latch 22 then records which button has been pressed 44 and sets the standby interrupt to signal the computer to awaken, according to standard Intel SMI protocols. The SMI interrupt handler then pre-fills 46 the video buffer 36 with the stored screen display 30 for the chosen application and immediately starts to check 48 for user inputs. As the user enters data and makes key strokes and mouse clicks, the operating system fills 50 a buffer in RAM 26 with these inputs for use as soon as the full application is functioning. These functions can be multitasked to proceed in parallel. Control is then handed back 52 to the Windows operating system and a specialized virtual device VxD is set 54, such that the chosen application is the first one awakened 56 by the Windows system. The chosen application's display is immediately shown and its program is executed first, before any other programs.

Then, normal Windows operations proceed 58. If the computer enters standby mode 60, upon notification by the power management system, all currently running instantly available programs have their latest screen displays recorded 62 into their respective protected RAM areas 30, for use when the system comes out of standby. After these screen displays are recorded, the system retreats 64 into standby mode.

Figure 4:
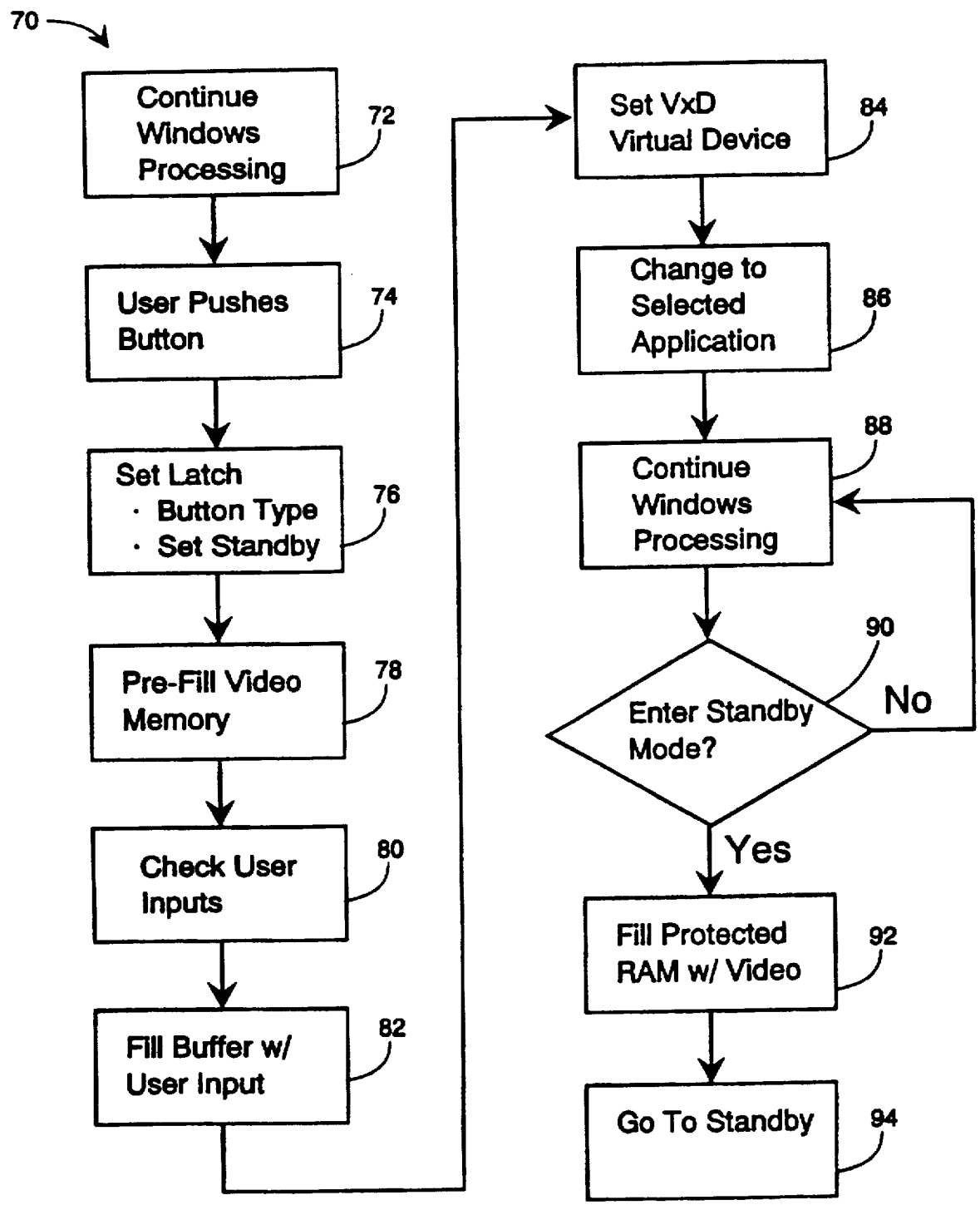
FIG. 4 is a flow chart of an operation sequence for quick access to a computer application.

Referring to the flow chart 70 of FIG. 4, during windows operation 72, if the user wishes to change one instantly available application for another he can push 74 another of the application keys 12, processing proceeds along the same path as in FIG. 3, where the latch is set 76, the video buffer is pre-filled 78 with the new display, user inputs are checked 80 and filled 82 into a buffer, the specialized VxD device is set 84 for the new application and then the new application is loaded 86. After this, normal windows processing continues 88 until standby mode 90, at which time the protected RAM areas 30 are again filled 92 with the last screen displays of all instantly available applications, allowing the system to enter standby 94 again.

What is claimed is:

1. A method for enabling a user of a personal general purpose computer to rapidly begin using applications which have been previously placed in a non-running state, the personal general purpose computer having system and long-term storage memories, the personal general purpose computer having a keyboard for data entry, the personal general purpose computer having buttons, each button being associated with one of the applications, the personal general purpose computer having a display for displaying interactive screens Generated by the applications, comprising the steps of:

storing the applications in the long-term storage memory;

loading the applications from the long-term storage memory into the system memory to run the applications;

placing an application into the non-running state by having at least a portion of the software code required to run the application removed from the system memory;

prior to a time when one of the applications was placed in the non-running state:

storing, in the system memory of the computer, information defining an image of an interactive screen associated with the application; and locking the memory in which the image is stored to prevent corruption by other running applications; and in response to a request from the user to begin using the application, by the user pressing the button associated with the application, at a time when the interactive screen image is not displayed, and before the application has been sufficiently loaded into the system memory of the computer to be again running:

displaying, to the user, the image defined by the stored information.

2. The method of claim 1 further comprising accepting keyboard input from the user before the application has been sufficiently loaded into the system memory of the computer to be again running.

3. The method of claim 1 further comprising compressing the image as it is stored in system memory and decompressing it for display.

4. The method of claim 1 wherein information is stored defining images of interactive screens associated with additional applications, and in response to a request from the user to return any of the applications to a running state, and before the application has been sufficiently loaded into the memory of the computer to be again running, filling the video memory with the image associated with the application.

5. The method of claim 1 wherein the application is in a non-running state because a processor in the computer is in a standby mode.

6. The method of claim 1 wherein the image for which information is stored is the image that was being displayed when the application was previously placed in a non-running state.

7. The method of claim 1 further comprising:

before the application has been sufficiently loaded into system memory to be again running, accepting user input for the application associated with the image of the interactive screen.

8. The method of claim 7 further comprising:

before the application has been sufficiently loaded into system memory to be again running, accepting user input for the application associated with the image of the interactive screen.

9. The method of claim 8 further comprising storing, in the system memory of the computer, basic input software for the application along with the information defining the image of the interactive screen.

10. The method of claim 9 wherein the basic input software, in response to the request from the user, and before the application is sufficiently loaded into system memory to be again running, fills a buffer in the system memory with the user input for use by the application when it is sufficiently loaded to be again running.

11. The method of claim 10 wherein the user input can comprise a key stroke, a mouse movement, or a mouse click.

12. A method for enabling a portable general purpose computer to exhibit the character of both a general purpose computer and a personal digital assistant having dedicated applications, the portable general purpose computer having system and long-term storage memories, the portable general purpose computer having a keyboard for data entry, the portable general purpose computer having buttons, each button being associated with one of the applications, the portable general purpose computer having a display for displaying interactive screens generated by the applications, the method comprising the steps of:

storing the applications in the long-term storage memory;

loading the applications from the long-term storage memory into the system memory to run the applications;

placing an application into a non-running state by having at least a portion of the software code required to run the application removed from the system memory;

maintaining, in the system memory of the computer, information concerning selected interactive screens associated with the applications, the information being maintained in the system memory even at times when the applications are not running, at times when one of the applications is not running, and its interactive screen is not displayed, receiving from the user a request to use the application, by the user pressing the button associated with the application, and before the application is sufficiently running to accept user input, and after the user has requested to use it, displaying one of the selected interactive screens and accepting user input for the application in a way that gives the user the impression that the application is sufficiently running.

13. The method of claim 12 wherein one of the selected interactive screens for which information is stored in the memory for a given application is the screen which was displayed when the given application was most recently running.

14. The method of claim 12 wherein the selected interactive screen that is displayed when the user has requested to use the application is the same one regardless of which interactive screen had been displayed when the application was most recently running.

15. The method of claim 12 wherein the identity of the application which is activated in response to the request from the button may be changed by the user.

16. The method of claim 12 wherein there are different buttons assigned to a single application, and the buttons activate different interactive screens of the application.

17. Apparatus comprising a general purpose computer configured to provide a multitasking windowed graphical interface in which a user may interact with application programs by observing interactive screens and providing input related to the displays, the general purpose computer having system and long-term storage memories, the applications being stored in the long-term storage memory and being loadable from the long-term storage memory into the system memory, the general purpose computer having a keyboard for data entry, the general purpose computer having a display for displaying interactive screens generated by the applications, and a dedicated hardware switch associated with one of the application programs, the associated application program being at times in a non-running state, the non-running state being where at least a portion of the software code required to run the application has been removed from the system memory, the computer being arranged to respond to the dedicated hardware switch, at times when the associated application is in the non-running state, by essentially instantaneously causing the application to seem to the user to be active.

18. The apparatus of claim 17 wherein the application is enabled to seem essentially instantaneously active by displaying an interactive screen of the associated application and accepting input for the associated application from the user before the associated application has been sufficiently loaded into the system memory to be running.

19. The apparatus of claim 17 wherein the non-running state occurs because a processor of the computer is in a standby mode, and the computer is awakened in connection with responding to the dedicated hardware switch.

20. The apparatus of claim 17 wherein the interactive screen which is provided essentially instantaneously comprises a screen that had been displayed at the time the application entered a non-running state.

21. The apparatus of claim 17 wherein the interactive screen which is provided instantaneously comprises a preselected one of the screens available from the associated application.

22. The apparatus of claim 17 wherein the computer is also arranged to store screen information in the memory of the computer with respect to the associated application in preparation for responding to the dedicated switch.

23. The apparatus of claim 17 further comprising additional dedicated hardware switches associated with other ones of the application programs, the computer also being configured to respond to each of the dedicated hardware switches by essentially instantaneously causing each of those applications to seem to the user to be active.

24. The apparatus of claim 17 wherein the associated application comprises a calendar, an address book, or a list maker.

25. Apparatus comprising:
   a general purpose computer configured to provide a multitasking windowed graphical interface in which a user may interact with application programs by observing interactive screens and providing input related to the displays, the personal general purpose computer having system and long-term storage memories, the applications being stored in the long-term storage memory and being loadable from the long-term storage memory into the system memory, the personal general purpose computer having a keyboard for data entry, the personal general purpose computer having a display for displaying the interactive screens generated by the applications, and dedicated hardware switches associated with the application programs, each associated application program being at times in a non-running state, the non-running state being where at least a portion of the software code required to run the application has been removed from the system memory, the computer being arranged to respond to each dedicated hardware switch, at times when the associated application is in the non-running state, and its interactive screen is not being displayed, by displaying an interactive screen of the associated application and accepting input for the associated application from the user before the associated application has been sufficiently loaded into the system memory to be running, the computer being arranged to store the interactive screen in the memory of the computer with respect to the associated application before the application was placed in the non-running state, in preparation for responding to the dedicated hardware switch of its associated application.

* * * * *